(12) United States Patent
Balanon

(10) Patent No.: US 11,591,158 B2
(45) Date of Patent: Feb. 28, 2023

(54) REMOTE-CONTROLLED SYSTEM AND METHOD FOR TRANSPORTING TRASH

(71) Applicant: Rizaldy E. Balanon, Oxnard, CA (US)

(72) Inventor: Rizaldy E. Balanon, Oxnard, CA (US)

(\*) Notice: Subject to any disclaimer, the term of this patent is extended or adjusted under 35 U.S.C. 154(b) by 0 days.

(21) Appl. No.: 15/936,401

(22) Filed: Mar. 26, 2018

(65) Prior Publication Data

US 2018/0282059 A1   Oct. 4, 2018

Related U.S. Application Data

(63) Continuation-in-part of application No. 14/943,601, filed on Nov. 17, 2015, now abandoned.

(51) Int. Cl.
| | |
|---|---|
| *B65F 1/14* | (2006.01) |
| *B61J 3/06* | (2006.01) |
| *B65G 19/02* | (2006.01) |
| *B65F 1/00* | (2006.01) |

(52) U.S. Cl.
CPC ........... *B65F 1/1468* (2013.01); *B61J 3/06* (2013.01); *B65G 19/02* (2013.01); *B65F 1/0053* (2013.01)

(58) Field of Classification Search
CPC ........... B61J 3/06; B65F 1/1468; B65G 19/02
See application file for complete search history.

(56) References Cited

U.S. PATENT DOCUMENTS

| | | | | |
|---|---|---|---|---|
| 1,162,760 | A * | 12/1915 | Fickinger | B61J 3/06 104/176 |
| 3,066,616 | A * | 12/1962 | Weisberg | A47G 29/1216 105/155 |
| 4,175,656 | A * | 11/1979 | Lang | B65G 19/02 104/162 |
| 5,042,642 | A * | 8/1991 | Ullrich | B65F 1/1468 198/750.1 |
| 5,096,049 | A * | 3/1992 | Anderson | B65F 1/1468 198/750.1 |
| 5,228,392 | A * | 7/1993 | Belanger | B65G 19/02 104/162 |
| 5,353,887 | A * | 10/1994 | Putnam | B65F 1/1468 104/246 |
| 6,237,503 | B1 * | 5/2001 | Kollbeck | B61B 5/025 104/173.1 |
| 2003/0002966 | A1 * | 1/2003 | Porter | B65F 1/1468 104/118 |
| 2009/0008888 | A1 * | 1/2009 | Boulden | B65F 1/1468 180/313 |

\* cited by examiner

*Primary Examiner* — James Keenan
(74) *Attorney, Agent, or Firm* — Michael D. Eisenberg

(57) ABSTRACT

A remote-controlled system and method for transporting trash comprises a carrier with wheels, a remote box having a remote transmitter and a motor, a conveyor bar attached to at least one stand, and a pair of rails. The carrier sits on the rails and moves along the rails based on its communication with the remote box. The box has a remote transmitter and a motor component that commands the carrier to move vertically down the rails at the discretion of a user. The rails are parallel to the conveyor bar and are attached to the remote box on the conveyor bar.

13 Claims, 8 Drawing Sheets

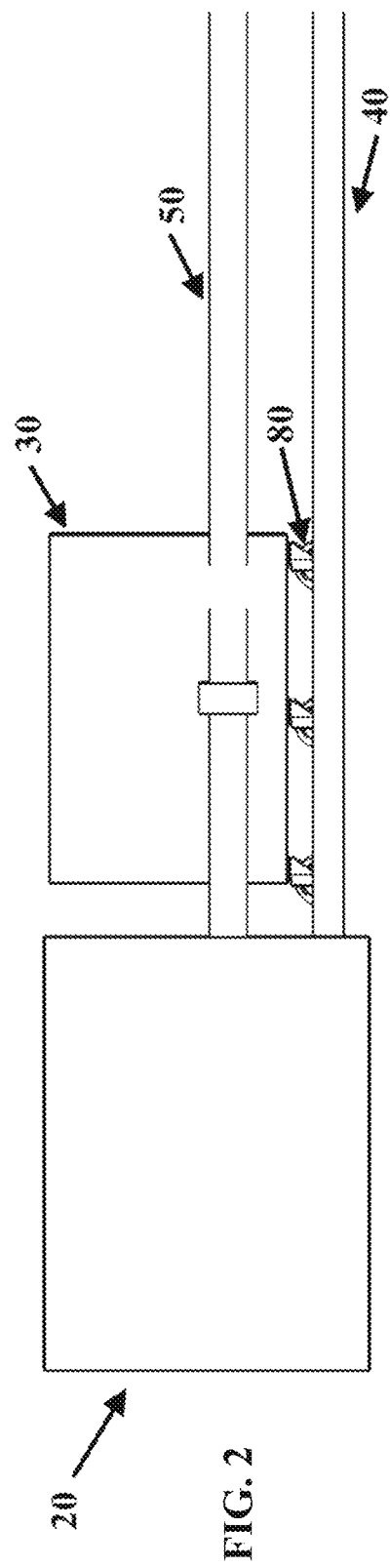

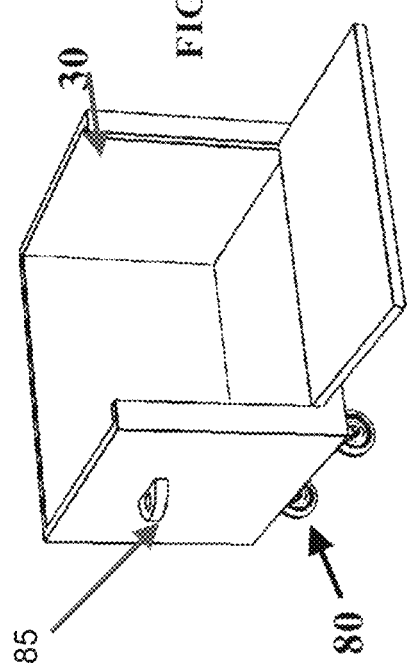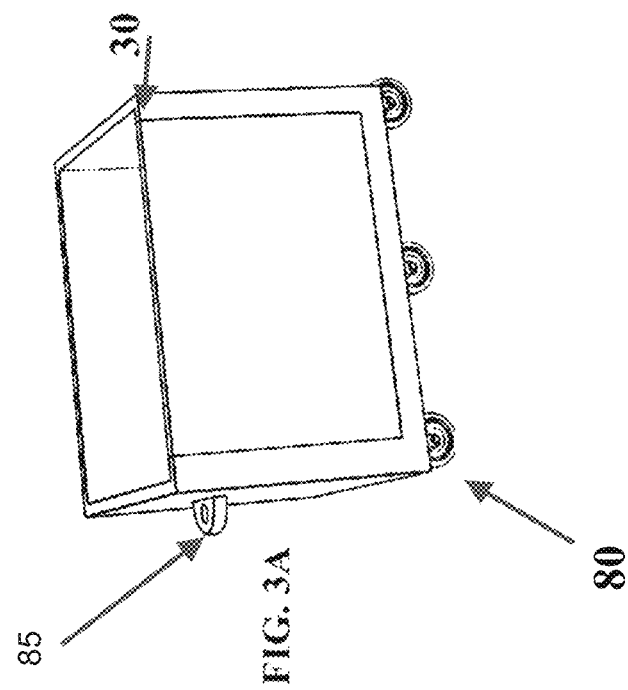

REMOTE-CONTROLLED SYSTEM AND METHOD FOR TRANSPORTING TRASH

CROSS-REFERENCES TO RELATED APPLICATIONS

The present application is a continuation in part of U.S. application Ser. No. 14/943,601 filed Nov. 17, 2015, which is hereby incorporated herein by reference in its respective entirety.

TECHNICAL FIELD

The present invention relates to a remote-controlled system and method for the delivery of garbage from one location to another.

BACKGROUND OF THE INVENTION

Generally, refuse produced or discharged by residents of a building, such as a multiple dwelling house, an apartment, or the like, has been treated in such a way that the refuse is filled into plastic bags, plastic buckets, or the like by each resident in the building, and the bags or the buckets are brought by each resident from each room to an established refuse accumulation area or site on the lowest floor. For example, a resident brings one or more plastic bags that are filled with refuse, gets on an elevator box or goes down the stairs on foot to the established refuse accumulation area, and dumps them out on a predetermined refuse gathering day.

Furthermore, an installation called "trash transporting system" has also been employed, which is provided in a building for conveying refuse. The trash chute system is of a vertically extended hole structure in which a trash chute that is defined by surrounding side walls extends vertically through a building, and has openings in one of the side walls at respective floors through which residents can throw refuse.

When using the trash chute, residents put home refuse in a container, such as a plastic bag or plastic or metal bucket, bring the bag or the like container containing the refuse to the nearest opening, and throw away the refuse into the trash chute. The refuse falls down to the bottom of the chute, at the lowest floor, and is accumulated there. The accumulated refuse is taken out from the bottom portion of the chute at predetermined intervals, e.g., once a day or twice a week.

Various other conventional systems are available that are related to trash chutes. For example: U.S. Pat. No. 5,000,641 to Shimizu Construction Co., Ltd., U.S. Pat. No. 5,762,083 to Skyscraper Cleaning Services Inc., U.S. Pat. No. 8,196,735 to Masami Sakita, U.S. Pat. No. 6,196,240 to Howard Liao, Hen Liao, Gun Je Liao, Han-Pin Liu, Chih Hsiung Kuo, and U.S. Pat. No. 4,285,624 to Herman Miller, Inc.

The conventional trash transporting methods described above have various problems. For example, carrying the refuse to the accumulation site on foot is a time-consuming job for residents, and a bad smell is discharged from the refuse and hangs in the air when carrying the refuse from each home to the accumulation site. Also, in the former case, the comfortable or hygienic environment in the home is disrupted by the bad smell or similar discharge by the refuse which the residents are compelled to keep in the room in order to avoid dumping it in a public space, such as the accumulation site on the day or days other than the specified gathering days. In the case of the trash chute, the refuse also adheres to the inner walls of the trash chute, and the adhering refuse gives off a bad smell in the air.

The present invention provides a remote-controlled trash transporter system for household purposes or the like that transports the trash from one place to another by means of using a remote controlled trash bin. This system allows for the transportation of garbage without contaminating the building. It also transports garbage without manpower and it is simple and inexpensive to manufacture. Furthermore, the system is simple to use.

BRIEF SUMMARY OF THE EMBODIMENTS OF THE INVENTION

In a variant, a system for transporting trash comprising a carrier having wheels, configured to receive trash; a remote box having a remote transmitter and a motor configured to move the carrier; a conveyor bar attached to at least one stand configured to secure the system to an external surface; a pair of rails disposed parallel to the conveyor bar and configured to receive the wheels of the carrier; a gate configured to slide over the rails at a perpendicular position to the rails, having an opening configured to receive trash from the carrier and to release trash; and a swivel plate disposed at a bottom of the carrier and configured to rotate the trash. The rails are configured to attach to the remote box and to traverse through the opening of the gate. The remote box is configured to communicate with the carrier and the carrier is configured to move when the remote box transmits a command to move.

In another variant, the conveyor bar is disposed at a position that is higher than a position of the pair of rails.

In a further variant, the stand is disposed in a vertical position and comprises a bolt configured to be secured into an area of ground.

In yet another variant, the conveyor bar is disposed perpendicular to the stand.

In another variant, a first end of an extension bar is configured to attach to a first end of the conveyor bar.

In a further variant, a first end of a first extension rail is configured to attach to a first end of a first rail in the pair of rails and a first end of a second extension rail is configured to attach to a first end of a second rail in the pair of rails.

In yet another variant, the extension bar is configured to receive additional extension bars and the extension rails are configured to receive additional extension rails.

In another variant, the carrier has a first receptacle configured to receive trash and a second receptacle to receive recycling items.

In a further variant, the first receptacle is configured to receive a garbage can.

In yet another variant, a method for transporting trash, comprising releasing trash into a carrier disposed on a pair of rails; sorting trash into a first receptacle for garbage and a second receptacle for recycling items, wherein both receptacles are disposed in the carrier; commanding the carrier to move via a remote-controlled box disposed on a conveyor bar; moving trash along the pair of rails; sliding a gate having an opening over the rails to receive trash from the carrier through the opening; rotating trash with a swivel plate disposed on a top of the carrier; and disposing trash at a collection site. The remote-controlled box communicates a plurality of commands to the carrier.

In another variant, attaching a first end of an extension bar to a first end of the conveyor bar.

In a further variant, attaching a first end of a first extension rail to a first end of a first rail in the pair of rails and attaching a first end of a second extension rail to a first end of a second rail in the pair of rails.

In yet another variant, attaching additional extension bars to the conveyor bar and attaching additional extension rails to the pair of rails.

In another variant, powering the remote-controlled box with a motor.

In a further variant, attaching a stand to the conveyor bar that is secured to an area of land with a bolt.

BRIEF DESCRIPTION OF THE DRAWINGS

FIG. 2 is an illustration of a carrier on a pair of rails and a remote-controlled box at an end of a conveyor bar.

FIG. 3A is a close-up view of the closed carrier.

FIG. 3B is a close-up view of the open carrier.

Figures 1A, 1B:
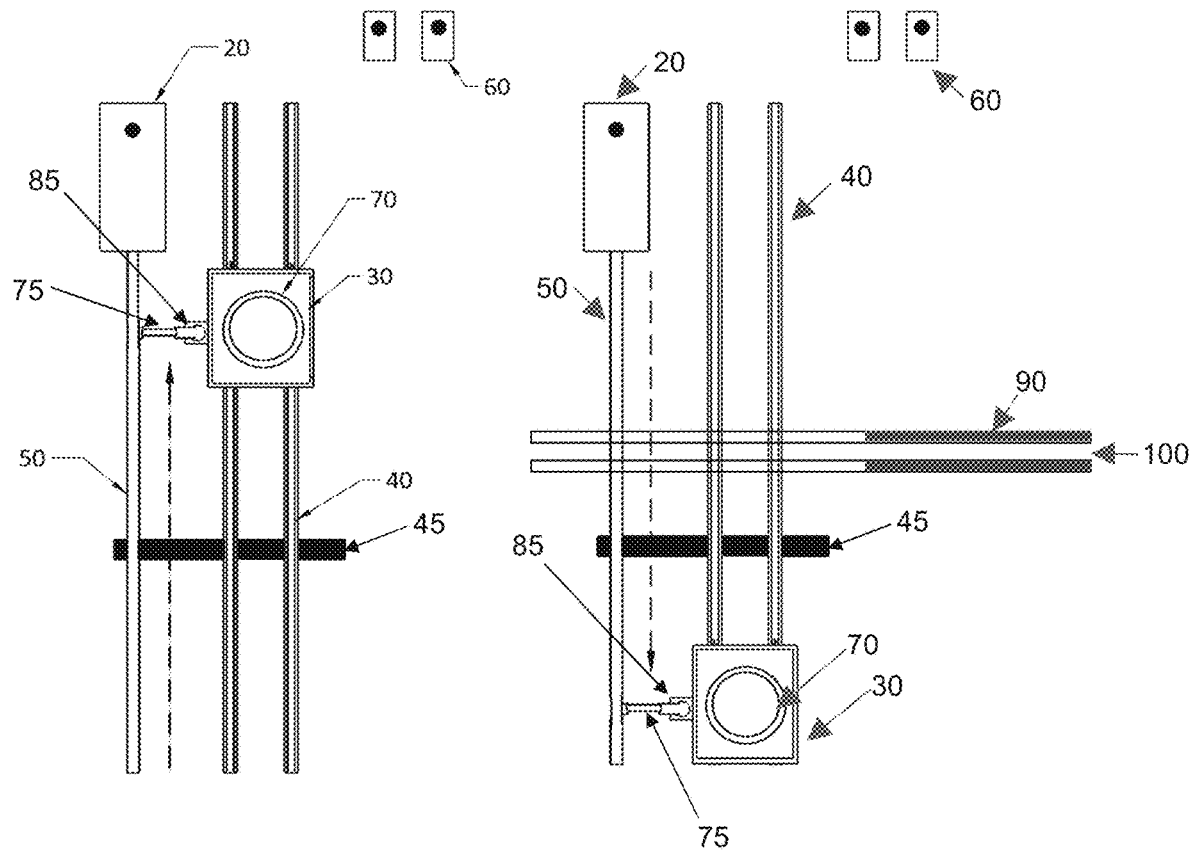
FIG. 1A is an illustration of a conveyor bar attached to a carrier disposed on a pair of rails.
FIG. 1B is an illustration of a conveyor bar attached to a carrier disposed on a pair of rails that traverse through an opening of a sliding gate.

DETAILED DESCRIPTION OF THE
EMBODIMENTS OF THE INVENTION

The following reference numbers are used throughout this document:
20 Remote-controlled box
25 Trash receptacle
30 Carrier
35 First vertical leg
40 Pair of rails
45 Stand for rails
50 Conveyor bar
51 Holes for receiving bolts
52 Shorter vertical leg
53 connection point
55 Horizontal leg
60 Remote control
65 Recycling receptacle
70 Swivel plate
75 Latch
80 Carrier wheels
85 Hook
90 Gate
95 House
100 Gate opening
110 Extension bar
115 Bolt
120 Extension rail In a variant, referring generally to FIGS. 1A-6, a remote-controlled system and method for transporting trash comprises a carrier 30 with wheels 80, a remote box 20 having a remote transmitter 60 and a motor, a conveyor bar 50 attached to at least one stand 45, and a pair of rails 40. The carrier 30 sits on the rails 40 and moves along the rails 40 based on its communication with the remote box 20. The box 20 has a remote transmitter 60 and a motor component that commands the carrier 30 to move horizontally down the rails 40 at the discretion of a user. The rails 40 are parallel to the conveyor bar 50 and are attached to the remote box 20 on the conveyor bar 50. However, the conveyor bar 50 is elevated in relation to the rails 40. The rails 40 also traverse through an opening 100 in a sliding gate 90 that is disposed at a perpendicular position to the rails 40. The gate 90 slides over the rails 40 horizontally and has an opening 100 through which the carrier 30 can move. The carrier 30 contains two bins, one for trash 25 and one for recycling 65. The carrier 30 also has a swivel plate 70 at its bottom, which rotates the bins 25, 65 and thus, rotates the trash.

The stand 45 comprises a first vertical leg 35, which connects to a horizontal leg 55, which then attaches to second, shorter vertical leg 52. The horizontal leg 55 connects to the first vertical leg 35 between the ends of the vertical leg, preferably inside a middle portion. Optionally, the horizontal leg 55 connects to the shorter vertical leg 52 at an upper end of the shorter vertical leg 52. The second shorter vertical leg is shorter than the first vertical leg 35. The entire stand 45 forms a lowercase "h" shape to support the conveyor bar 50, and rails 40 by resting the rails 40 on top of the horizontal legs 55. The stand attaches to the conveyor bar 50 via a connection point 53 at an upper end of the first vertical leg 35. The stand 45 has holes 51 for receiving bolts on either ends of the vertical legs 35, 52. The stand 45 secures the entire system to the ground, concrete or soil using a bolt 115. More than one stand 45 may be used along the conveyor bar 50.

In another variant, referring to FIGS. 1A-1B, the carrier 30 moves along the rails 40 and is also attached to the conveyor bar 50. The carrier 30 is at a first position as shown in FIG. 1A, and moves along the rails 40 to a second position, as shown in FIG. 1B. The carrier 30 moves through the opening 100 in the gate 90. FIG. 1B depicts the gate 90 sliding.

In a further variant, referring to FIG. 2, the carrier 30 has wheels 80 that fit onto the rails 40. FIG. 2 shows the carrier 30 on the pair of rails 40 with its wheels 80 on the rails 40 in a starting position with the remote box 20 attached to the conveyor bar 50. The carrier 30 comprises a hook 85 that receives a latch 75 to secure the carrier 30 to the conveyor bar 50.

Figure 3D:
FIG. 3D is a close-up side view of the swivel plate.
Figure 3C:
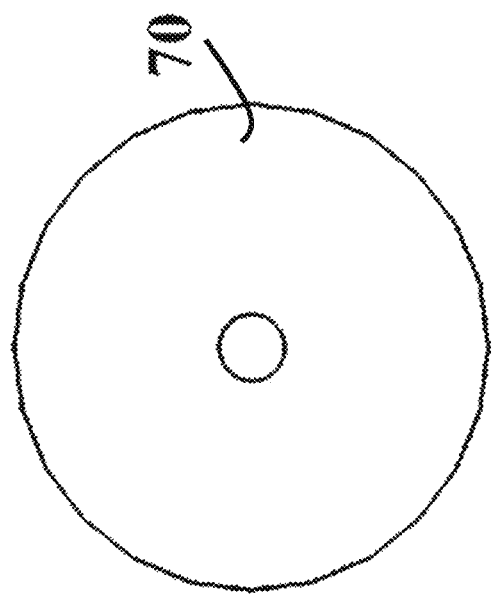
FIG. 3C is a close-up top view of the swivel plate.

In yet another variant, referring to FIGS. 3A-3D, the carrier 30 and swivel plate 70 attach together. The swivel plate 70 is located on the bottom of the carrier 30 and rotates the trash. FIG. 3A depicts the carrier 30 in a closed position. FIG. 3B shows the carrier 30 in an open position. FIGS. 3C-3D depict the swivel plate 70 in a circular shape.

Figure 4:
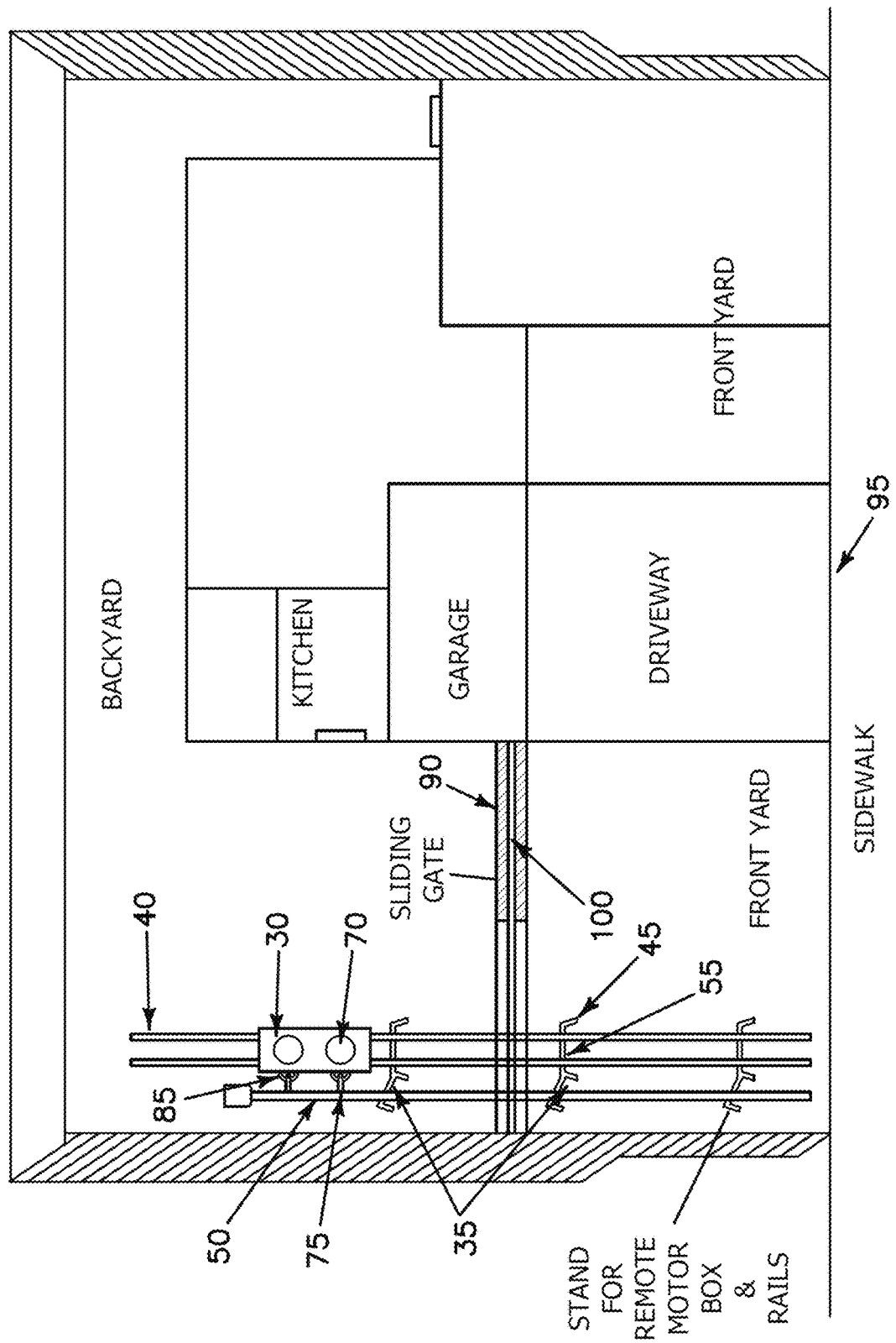
FIG. 4 is a top view of the system attached to a garage of a house.

In another variant, referring to FIG. 4, the system is attached to a house 95. The carrier 30 is attached to the conveyor bar 50 with the latch 75 that connects into the hook 85 on the carrier. The stand 45 secures the entire system using its three components, the first vertical leg 35 directly attached to the conveyor bar 50, the horizontal leg 55, and the second vertical leg 35 that is parallel to the first vertical leg 35. The stand 45 provides support for the system by securing the conveyor bar to the ground using a bolt 115.

Figure 5:
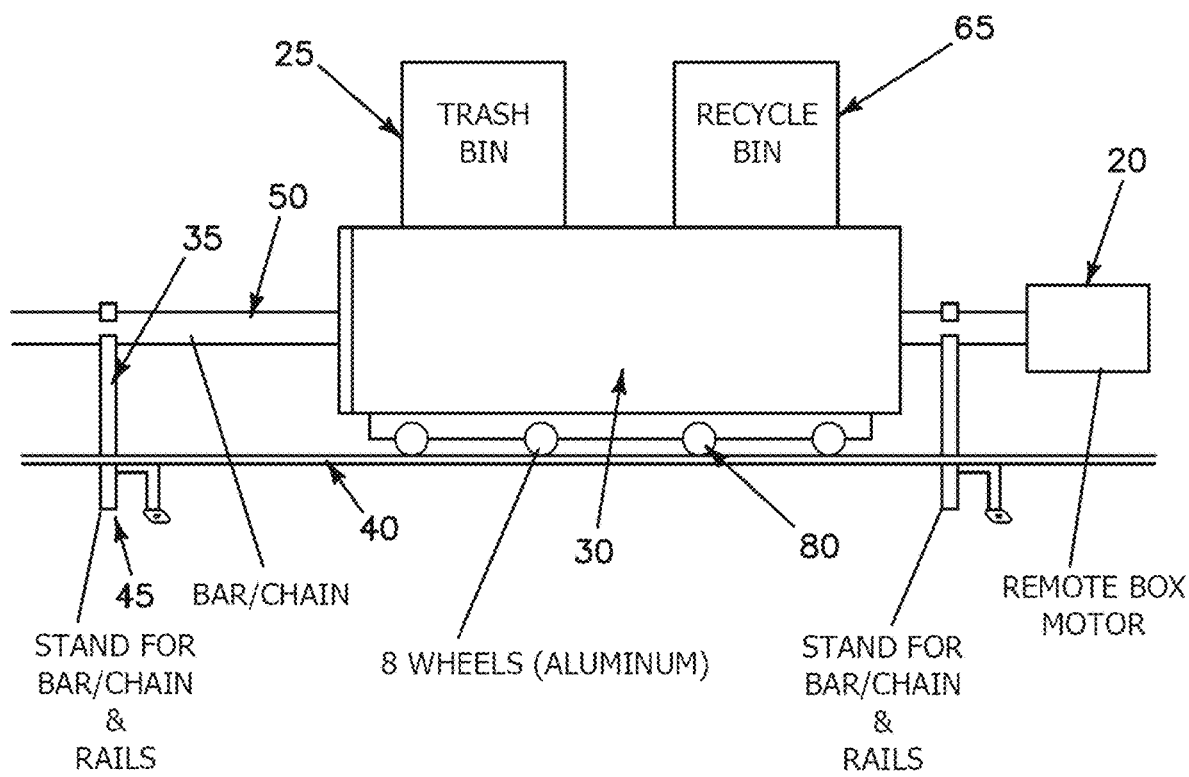
FIG. 5 is a front view of the system with a carrier having 8 wheels and containing a trash receptacle and a recycling receptacle.

In a further variant, referring to FIG. 5, the carrier 30 contains a trash receptacle 25 for collecting trash and a recycling receptacle 65 for collecting recycling. The carrier 30 comprises eight aluminum wheels 80 and the gate 90 is made out of aluminum.

Figure 6:
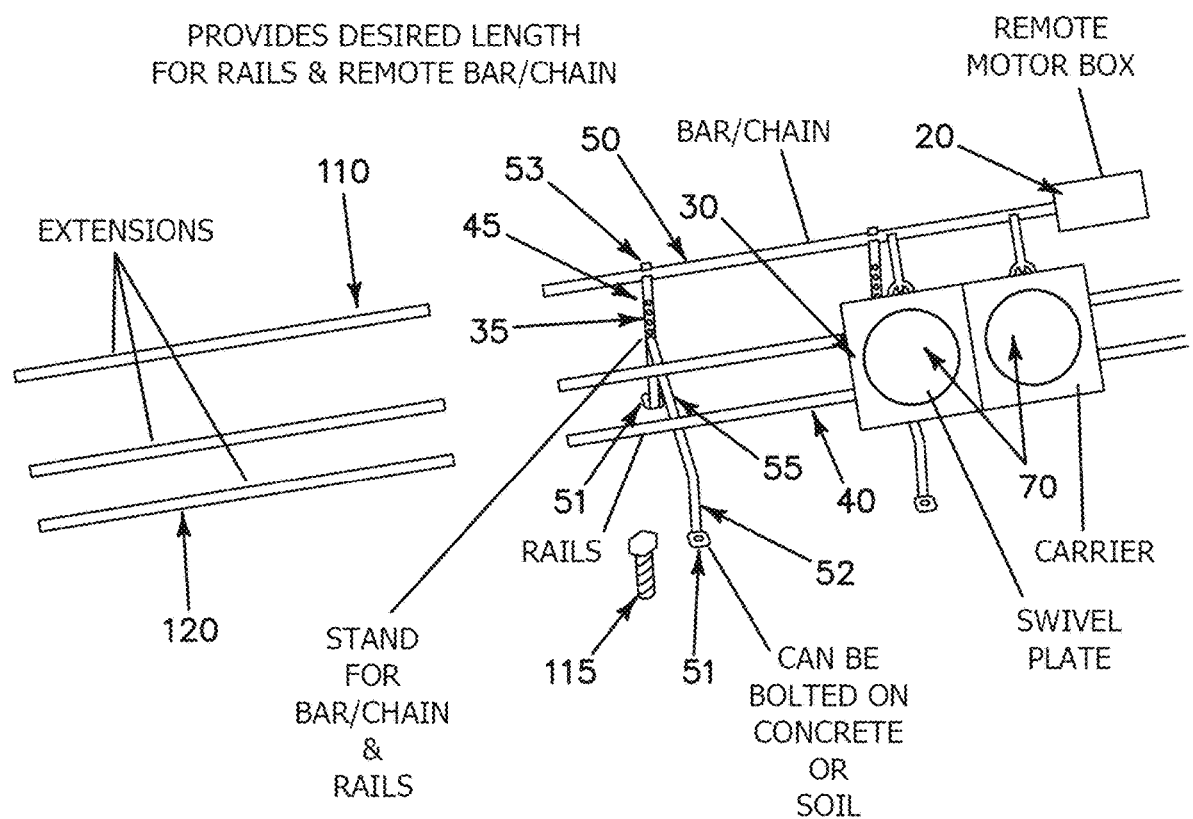
FIG. 6 is a top view of the system and a plurality of extensions that attach to the pair of rails and the bar.
Figure 7:
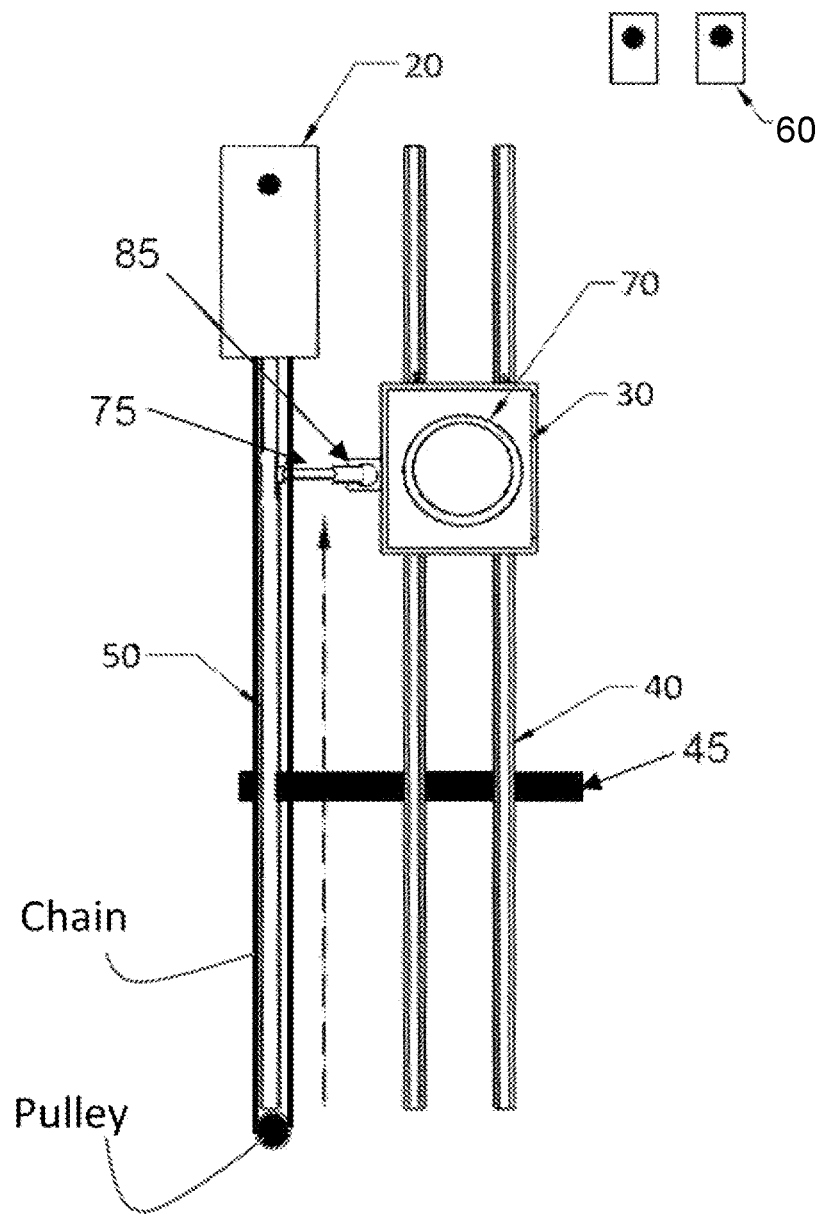
FIG. 7 is an illustration of a conveyor bar having a chain and pulley attached to a carrier disposed on a pair of rails.

In yet another variant, referring to FIG. 6, the conveyor bar 50 and the rails 40 can be extended. For example, an extension bar 110 can be added to the conveyor bar 50 and an extension rail 120 can be attached to each rail 40 in order to lengthen the entire system. More than one extension 110, 120 may be added to the bar 50 and the rails 40.

What is claimed is:

1. A system for transporting trash, comprising:
   a carrier having wheels, configured to hold trash;
   a pair of rails configured to receive the wheels of the carrier, to allow movement of the carrier along the rails;
   a conveyor bar, having a first end and a second end, the conveyor bar being parallel to the pair of rails and comprising a chain and a pulley, such that the pulley is at the second end of the conveyor bar and the chain wraps around the pulley;
   at least one stand joined to the conveyor bar and to the rails, the stand being configured to secure the system to an external surface and to suspend the rails above the external surface;
   a motor box joined to the first end of the conveyor bar, the motor box comprising a motor configured for moving the chain;
   a connector joined on one end thereof to the carrier and on another end thereof to the chain, such that a movement of the chain causes a movement of the carrier;
   a gate configured to slide over the rails at a perpendicular position to the rails, the gate separating a first region from a second region, the gate being configured for being opened and closed, such that when the gate is open the carrier is allowed ingress and egress between the first region and the second region; and
   a swivel plate disposed at a bottom of the carrier and configured for allowing rotation of the trash.

2. The system of claim 1, wherein the conveyor bar is disposed at a position that is higher than a position of the pair of rails.

3. The system of claim 2, wherein the stand is disposed in a vertical position and comprises a bolt configured to be secured into an area of ground.

4. The system of claim 3, wherein the conveyor bar is disposed perpendicular to the stand.

5. The system of claim 1, wherein a first end of an extension bar is configured to attach to a first end of the conveyor bar.

6. The system of claim 5, wherein a first end of a first extension rail is configured to attach to a first end of a first rail in the pair of rails and a first end of a second extension rail is configured to attach to a first end of a second rail in the pair of rails.

7. The system of claim 6, wherein the extension bar is configured to receive additional extension bars and the extension rails are configured to receive additional extension rails.

8. The system of claim 1, wherein the carrier has a first receptacle configured to receive trash and a second receptacle to receive recycling items.

9. The system of claim 8, wherein the first receptacle is configured to receive a garbage can.

10. The system of claim 1, further comprising at least one remote control and wherein the motor box comprises a receiver, such that the receiver is configured for receiving a communication from the remote control, and for activating the motor to move the chain in a desired direction, according to the communication.

11. The system of claim 1, wherein the stand forms a lowercase "h" shape.

12. The system of claim 1, wherein the stand comprises:
    a first vertical leg having an upper end that forms a connection point that is attached to the conveyor bar;
    a horizontal leg attached to the first vertical leg;
    a second vertical leg, shorter than the first vertical leg, attached to the horizontal leg;
    wherein the rails are disposed on top of the horizontal leg.

13. The system of claim 12, wherein the vertical legs comprise holes for receiving bolts at bottom ends of the vertical legs.

* * * * *